(12) United States Patent
Kannan et al.

(10) Patent No.: US 12,107,869 B1
(45) Date of Patent: Oct. 1, 2024

(54) AUTOMATED QUANTIFIED ASSESSMENT, RECOMMENDATIONS AND MITIGATION ACTIONS FOR ENTERPRISE LEVEL SECURITY OPERATIONS

(71) Applicant: Anvilogic, Inc., Palo Alto, CA (US)

(72) Inventors: Karthik Kannan, Palo Alto, CA (US); Deb Banerjee, Palo Alto, CA (US); Mackenzie Kyle, New York, NY (US); Benjamin Arnold, New York, NY (US); Kevin Gonzalez, Miami, FL (US); Jeswanth Manikonda, San Jose, CA (US)

(73) Assignee: Anvilogic, Inc., Palo Alto, CA (US)

( * ) Notice: Subject to any disclaimer, the term of this patent is extended or adjusted under 35 U.S.C. 154(b) by 109 days.

(21) Appl. No.: 17/153,807

(22) Filed: Jan. 20, 2021

(51) Int. Cl.
*H04L 9/00* (2022.01)
*H04L 9/40* (2022.01)

(52) U.S. Cl.
CPC ........ *H04L 63/1416* (2013.01); *H04L 63/105* (2013.01); *H04L 63/1425* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 9,654,485 B1* | 5/2017 | Neumann | H04L 63/1416 |
| 10,873,596 B1* | 12/2020 | Bourget | H04L 51/02 |
| 11,003,773 B1* | 5/2021 | Fang | G06N 20/00 |
| 2018/0373578 A1* | 12/2018 | Bridges | G06N 20/00 |
| 2021/0334386 A1* | 10/2021 | AlGhamdi | G06F 9/542 |
| 2022/0053016 A1* | 2/2022 | Trost | H04L 63/1416 |

* cited by examiner

*Primary Examiner* — Daniel B Potratz
*Assistant Examiner* — Syed M Ahsan
(74) *Attorney, Agent, or Firm* — Brill Law Office; Jeffrey Brill

(57) ABSTRACT

A dynamic threat landscape to which computer resources of a specific enterprise are subject is tracked. Data feeds maintained by a security system of the enterprise are assessed. The effectiveness of data feed utilization by the security system is quantified, relative to the threat landscape. Threat detection rules deployed by the security system are assessed, and the effectiveness thereof by the security system is quantified. Processing capability of alerts generated by threat detection rules and threat response capability may also be assessed and quantified. The effectiveness of the security system as a whole is automatically quantified, based on the tracked threat landscape, the quantifications of the effectiveness of data feed utilization, threat detection rule utilization, processing capability of alerts generated by threat detection rules and/or threat response capability. Recommendations concerning more effectively protecting the enterprise against specific threats are output. Actions are automatically taken to mitigate specific threats.

23 Claims, 3 Drawing Sheets

AUTOMATED QUANTIFIED ASSESSMENT, RECOMMENDATIONS AND MITIGATION ACTIONS FOR ENTERPRISE LEVEL SECURITY OPERATIONS

TECHNICAL FIELD

This disclosure pertains generally to computer security, and more specifically to automatically providing a quantified assessment, recommendations and mitigation actions for enterprise level security operations.

BACKGROUND

Enterprise level computer systems and services are constantly subject to malicious attempts to gain unauthorized access, attack, and otherwise compromise the systems and data. Adversaries use an ever changing variety of threats for this purpose, which can be characterized by their tactics, techniques and procedures. Enterprises deploy security systems comprising a variety of hardware and software. Different components of an enterprise level security system provide a variety of data feeds, technology, controls and resources aligned to defend the assets of the enterprise and its customers.

Many enterprises manage the operations of their security systems, sometimes in a centralized manner. A system within an enterprise that provides functionality for monitoring, aggregating, analyzing and responding to indications of threats across a set of security products used by the enterprise is often referred to as a SOC ("Security Operations Center"). A SOC typically works across a plurality security products deployed at different levels within the enterprise, such as network, backend of, endpoints, email server, etc. The SOC is responsible for aggregating, analyzing and responding to alerts concerning suspicious events or suspected malicious activities generated by the security products deployed by the enterprise, or from the machine data being logged and/or deployed by the enterprise. The functionality of a SOC may be provided by a combination of technology and human analysts.

It is to be understood that although such centralized enterprise level security functionality is referred to herein as a "SOC" for readability, such a centralized system may have other names in practice, and it is the functionality that is being referenced herein, not any specific naming convention.

A component often referred to as a SIEM (Security and Incident Event Management) is frequently deployed in the SOC, and may be utilized as a tool to implement portions of the above described functionality. A SIEM may provide real-time analysis of security alerts generated by applications, network, hardware and/or machine data, and may be configured with detection rules, such as code, logic, algorithms and/or models to process alerts and detect threats. A SIEM is typically fed data from an abundance of data domains and sources in the form of alerts and/or logs.

Security alerts are generated by various security products such as (for example) firewalls and anti-malicious code software, or from custom developed logic/analytical methods created by SOC analysts. Security alerts indicate suspected detection of suspicious/malicious events. There are many sources and types of raw logs that are fed to the SIEM, such as endpoints, servers, cloud workloads (e.g., AWS CloudTrail), web access logs, network flow logs, etc. Enterprise level detection rules are deployed at the SIEM, and correlate across these alerts and logs to detect new malicious/suspicious events. Thus, the processing of data feeds (e.g., alerts and logs) and the deployment of corresponding detection rules may be deployed at the SIEM to mitigate threats against enterprise networks and computer systems.

Enterprises may have more than one SIEM in their SOC, or they may have other or additional alert/logging aggregation, management and/or database tools that monitor, store, and/or process machine data to detect threats. It is to be understood that an enterprise level tool for the processing of security information and events including alerts, logs and corresponding rules need not be called a SIEM. In some scenarios, this functionality may be performed by one or more tools or systems having varying names. The term "SIEM" is used herein for readability, but it is the functionality that is referenced, not a specific name for it.

SOCs model their dynamic threat landscape by continuously researching and identifying factors such as the adversaries targeting their type of enterprise and their deployed operating systems (e.g., Windows, Linux, MacOS, etc.) and data center platforms (e.g., Amazon Web Services, Google Cloud Platform, Azure, etc.), as well as the key vulnerabilities within the enterprise, critical systems that are considered more likely to be attacked because of their asset value (e.g., specific workloads, business processes, software, users), etc. These attributes are used to identify a set of threat techniques and threat procedures that are currently most important for the enterprise to defend against to protect itself.

Conventionally, human SOC analysts need to constantly develop new detection capabilities and update existing capabilities to detect, triage, and respond to suspicious and malicious events, and to identify and defend against attack patterns that are relevant to the current threat landscape. Because of this, SOC analysts need information on factors such as how well they are currently logging data sets needed to detect relevant threats, how to effectively process the voluminous logs collected, which new alerts and logs should be collected to enable the most important detection rules to be effectively deployed relative to the current threat landscape, how well existing detections are covering current threat priorities, which existing and new rules to deploy to address the most important priorities based on the current threat landscape, and what are the most effective ways to triage and respond to alerts triggered to mitigate detected threats.

Enterprises often struggle to configure and leverage the multiple components of their security systems efficiently and effectively. Furthermore, SOCs, SEIMs and other security tools do not automatically or readily provide the information that is utilized by SOC analysts as described above. Instead, analysts conventionally use inconsistent and unrepeatable processes to attempt to glean such information, to quantify the effectiveness of their security systems, and to attempt to quantify the overall risk posture of the enterprise. Not only is this extremely labor intensive for the human analysts, but it also subject to providing an inaccurate assessment of the configuration of the security system and its vulnerabilities, resulting, for example, in a false sense of security and/or an exaggerated view of vulnerability.

It would be desirable to address these issues.

SUMMARY

The cybersecurity risk posture of an enterprise is assessed, and this posture is quantified with a score. This score quantifies the overall effectiveness of the enterprise level security system (e.g., a SOC in which one or more SIEMs are deployed). The score can be thought of as a measurement of the maturity level of the enterprise level security system (e.g., the SOC). This score is based on the threat landscape affecting the enterprise (e.g., its existing infrastructure, technology, customers, processes, etc.), and the assessment and quantification of multiple specific areas of the enterprise level security system (e.g., current data feeds, deployed threat detection rules, detection rule alert processing capability, and threat mitigation and response capability).

The assessment and quantification of each separate area is itself based on the identification and analysis of a large number of relevant data points. These data points can be mapped to specific threats or threat types to which the enterprise is particularly subject, based on the analysis of the current threat landscape, and on the type and technological configuration of the enterprise itself. Thus, the overall score reflects the capability of the enterprise security system to prioritize, log, detect, react to, process, and properly mitigate relevant cybersecurity threats.

In order to determine a prioritization of threats to which the enterprise is especially vulnerable, the nature of enterprise itself is analyzed. Factors such as the field of operation, customer/user environment, physical location, and technological configuration/environment of the enterprise are identified. The dynamic threat landscape to which the enterprise is subject is tracked, and specific threat groups, adversaries and the like which target an enterprise of this type and/or target the specific platforms deployed by the enterprise are identified. From this, specific threat tactics, techniques, and procedures used by these threat groups are identified. A prioritization of specific threat tactics, techniques, and procedures against which to protect the enterprise is determined (e.g., those from which the enterprise is most subject to attack).

It is also determined which data feeds, threat detection rules, security controls, resources, methods, tools, etc., are most relevant to detect, analyze, respond to and mitigate these prioritized specific threat tactics, techniques, and procedures. Existing detection and response capabilities (e.g., logs, alerts, controls, resources, mitigation tools, etc.) used by the enterprise level security system are identified, and compared against those which have been determined to be most relevant for effectively defending against the prioritized threat tactics, techniques, and procedures.

The features and advantages described in this summary and in the following detailed description are not all-inclusive, and particularly, many additional features and advantages will be apparent to one of ordinary skill in the relevant art in view of the drawings, specification, and claims hereof.

The Figures depict various implementations for purposes of illustration only. One skilled in the art will readily recognize from the following discussion that other implementations of the subject matter illustrated herein may be employed without departing from the principles described herein.

DETAILED DESCRIPTION

Figure 3:
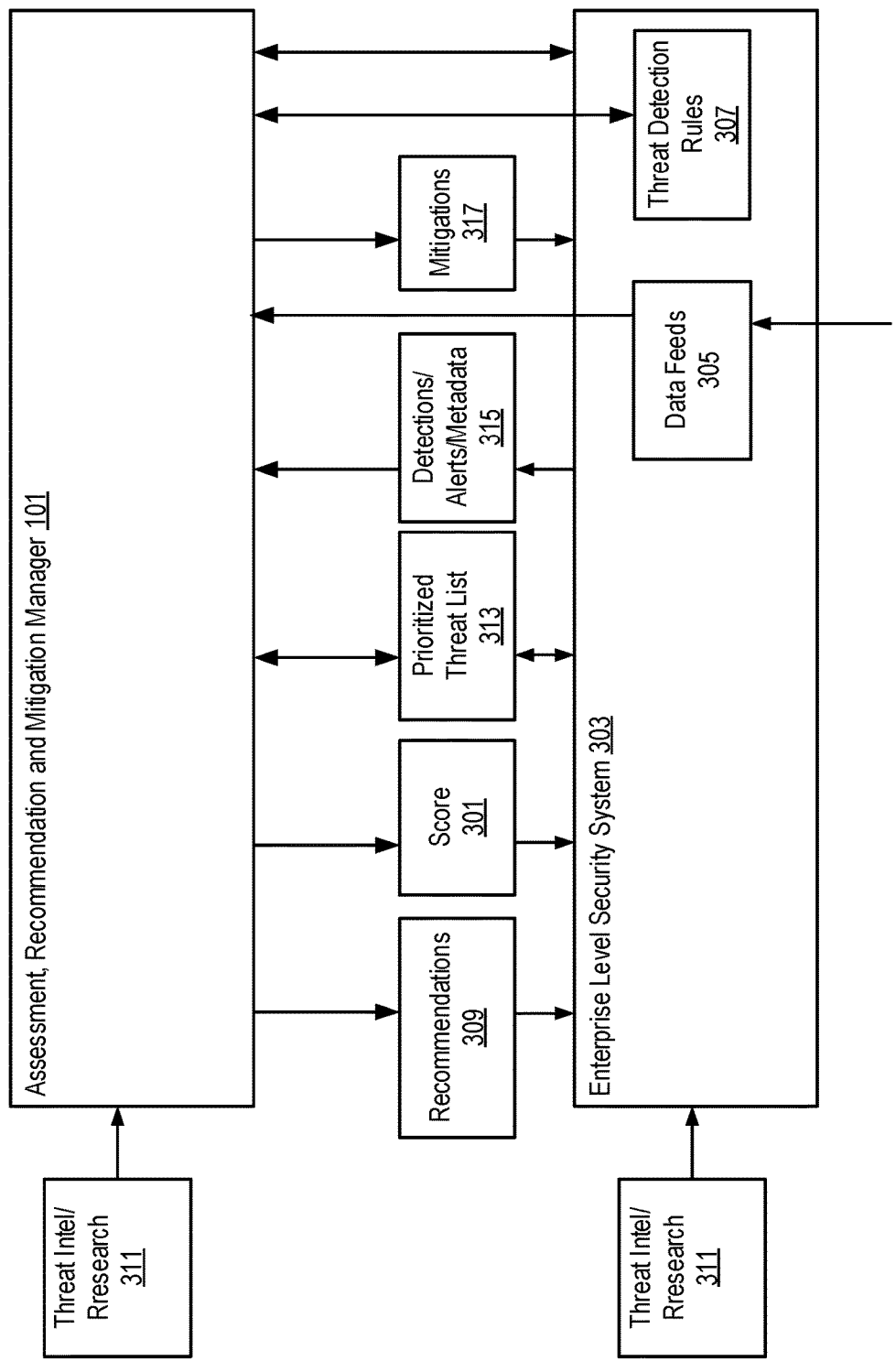
FIG. 3 is a block diagram of the operation of a recommendation and mitigation manager, according to some implementations.

A high level overview of the functionality of the assessment, recommendation and mitigation manager 101 is first described, in reference to FIG. 3. The assessment, recommendation and mitigation manager 101 automatically evaluates the cybersecurity risk posture of the enterprise 109, and quantifies this posture with a score 301. This score 301 quantifies the overall effectiveness of the enterprise level security system 303 (e.g., a SOC 111 in which one or more SIEMs 113 are deployed). The score 301 can be thought of as a measurement of the maturity level of the enterprise level security system 303. This score 301 is based on the threat landscape affecting the enterprise, and the assessment and quantification of multiple specific areas of the enterprise level security system 303 (e.g., current data feeds 305, detections, threat intelligence, deployed threat detection rules 307, detection rule alert processing capability, and threat response capability).

The assessment and quantification of each separate area is itself based on the identification and analysis of a large number of relevant data points. These data points can be mapped to specific threats or threat types to which the enterprise is particularly subject, based on the analysis of the current threat landscape, detections observed and threat intelligence, and on the type and technological configuration of the enterprise itself. Thus, the overall score 301 reflects the capability of the enterprise security system 303 to prioritize, log, detect, react to, process, and properly mitigate relevant cybersecurity threats.

In order to determine a prioritization of threats to which the enterprise is especially vulnerable, the nature of enterprise itself is analyzed. Factors such as the field of operation, customer/user environment, physical location, and technological configuration/environment of the enterprise are identified. The dynamic threat landscape to which the enterprise is subject is tracked, and specific threat groups, adversaries, detections from security products and alerts in the SIEM, and threat intelligence and the like which target an enterprise of this type and/or target the specific platforms deployed by the enterprise are identified. From this, specific threat tactics, techniques, and procedures used by these threat groups are identified. A prioritization of specific threat tactics, techniques, and procedures against which to protect the enterprise is determined (e.g., those from which the enterprise is most subject to attack). This is dynamic and may be continuously evaluated.

It is also determined which data feeds 305, threat detection rules 307, security controls, resources, methods, tools, etc., are most relevant to detect, analyze, respond to and mitigate these prioritized specific threat tactics, techniques, and procedures. Existing detection and response capabilities (e.g., logs, alerts, controls, resources, mitigation tools, etc.) used by the enterprise level security system 303 are identified, and compared against those which have been determined to be most relevant for effectively defending against the prioritized threat tactics, techniques, and procedures.

Thus, the assessment and quantification of data feeds 305, threat detection rules 307, detection rule alert processing capability, existing detections and threat response capability takes into account not only the current configuration of the enterprise level security system 303, but also the relevant configuration for effectiveness against the prioritized threat tactics, techniques, and procedures. In order to perform these assessments and quantifications, rich data models may be built, e.g., for feed data and threat detection rules that identify prioritized tactics, techniques, and procedures. Feed data and threat detection rules 307 can be automatically mapped into these data models. This automatic mapping can be performed based on rules, heuristics and/or machine learning.

The calculated score 301 can be used to identify areas of the enterprise level security system 303 that should be improved to better protect the enterprise from the cybersecurity threats to which it is most vulnerable. In addition, the assessment, recommendation and mitigation manager 101 can produce detailed recommendations 309 to improve the operation of the enterprise level security system 303 (and thus increase the score 301). Many relevant data points are analyzed to discover vulnerable areas in an organization's cybersecurity posture, and to provide recommendations for how to improve and decrease risk. Further, the assessment, recommendation and mitigation manager 101 can automatically take steps to mitigate threats, such as automatically executing recommendations. The assessment, recommendation and mitigation manager 101 can also automatically provide mitigations 317 to the enterprise level security system 303.

The score 301 and recommendations 309 may be output to enterprise level security system analysts and the like, for example through a dashboard or other form of user interface. The analysts can review the score 301 and recommendations 309, and take actions to improve the operation of the enterprise level security system 303. The performance of these actions in turn raises the score 301.

Figure 1:
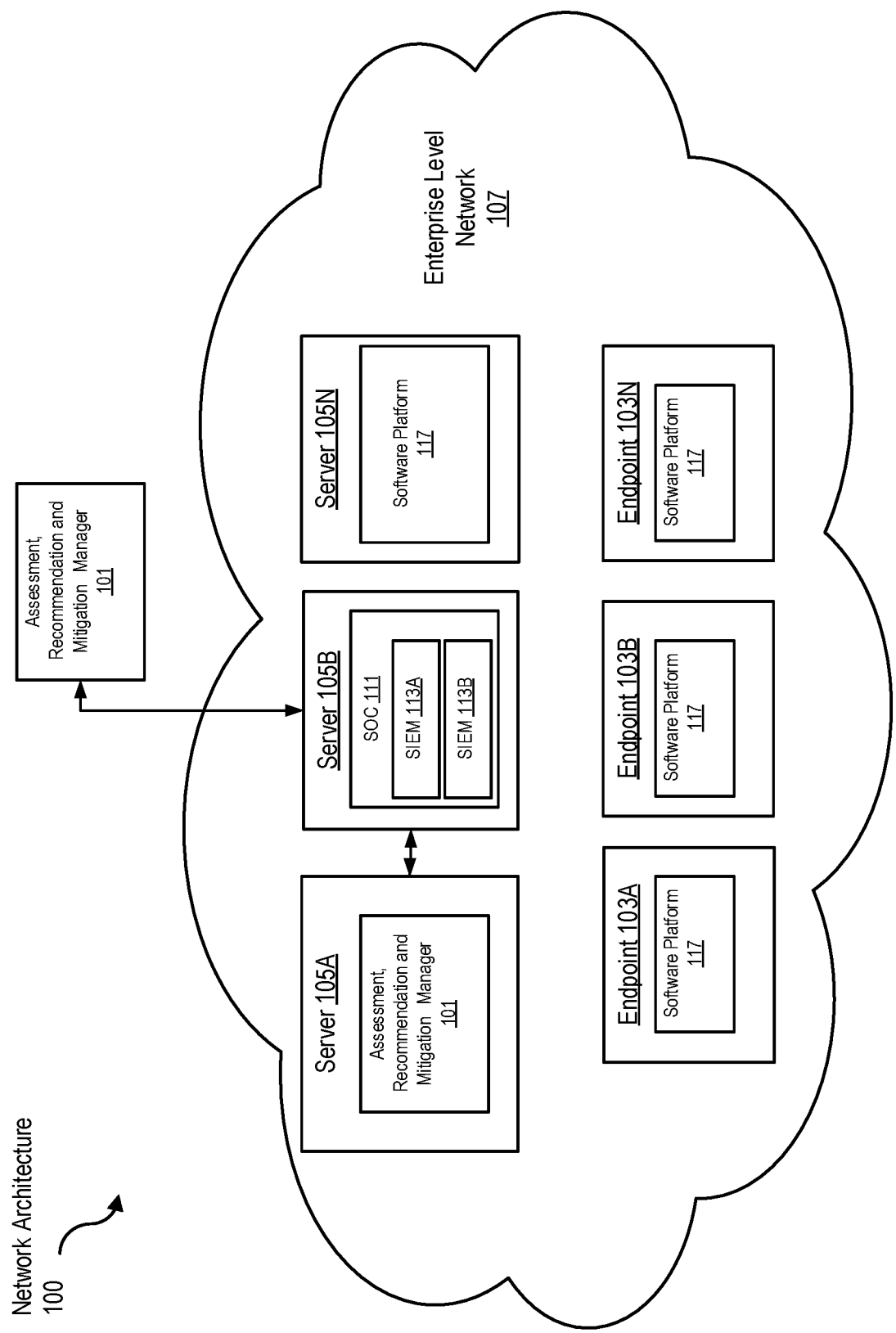
FIG. 1 is a block diagram of an exemplary network architecture in which an assessment, recommendation and mitigation manager can operate, according to some implementations.

Turning now to FIG. 1, an exemplary network architecture 100 in which an assessment, recommendation and mitigation manager 101 can operate is illustrated. The illustrated network architecture 100 comprises an enterprise level network 107 (e.g., a wide or local area network maintained by an enterprise 109), in which multiple computing devices are present, such as multiple servers 105A, 105B and 105N, and multiple endpoints 103A, 103B and 103N. It is to be understood that an enterprise level network 107 also typically comprises various conventional networking devices such as routers, switches, gateways, etc., which are not illustrated in FIG. 1. Various software platforms 117 can be deployed on the computing devices as desired, such as software that provides services delivered by the enterprise, as well as software that provides various infrastructure utilized by the enterprise. As "enterprise" 109 is used herein, the term means any organization that maintains a computer network 107, not just commercial enterprises. Thus, in addition to corporations and other types of business organizations, governments, universities, and not for profit organizations are also examples of enterprises 109.

The enterprise level network 107 contains a SOC 111 in which several SIEMs 113 are deployed. Although the SOC 111 is illustrated as residing on server 105B, it is to be understood that the functionality of a SOC 111 may be distributed across multiple computing devices.

In FIG. 1, the assessment, recommendation and mitigation manager 101 is illustrated as residing on server 105A and outside of the enterprise level network 107 in the cloud. It is to be understood that this is an example only, and in various implementations various functionalities of this system 101 can be instantiated on various types of computing devices (in or outside of the enterprise level network 107), or can be distributed between multiple computing devices as desired. The operation of the assessment, recommendation and mitigation manager 101 is described in detail below in conjunction with FIGS. 3 and 4.

Servers 105 and endpoints 103 can be implemented using computer systems 210 such as the one illustrated in FIG. 2 and described below. The servers 105 and endpoints 103 are communicatively coupled to the network 107, for example via a network interface 248 as described below in conjunction with FIG. 2. Endpoints 103 are able to access applications and/or data on servers 105 using, for example, a web browser or other endpoint software (not shown). Endpoints 103 can but need not be in the form of mobile computing devices, comprising portable computer systems 210 capable of connecting to a network 107 and running applications, such as smartphones, tablets, laptop computers, wearable computing devices, etc.

Although FIG. 1 illustrates three servers 105 and three endpoints 103 as an example, in practice many more computing devices may be deployed, including orders of magnitude more. Typically, the enterprise level network 107 is communicatively coupled to the internet 115. Other networks 107 or network-based environments can be used in other implementations.

Figure 2:
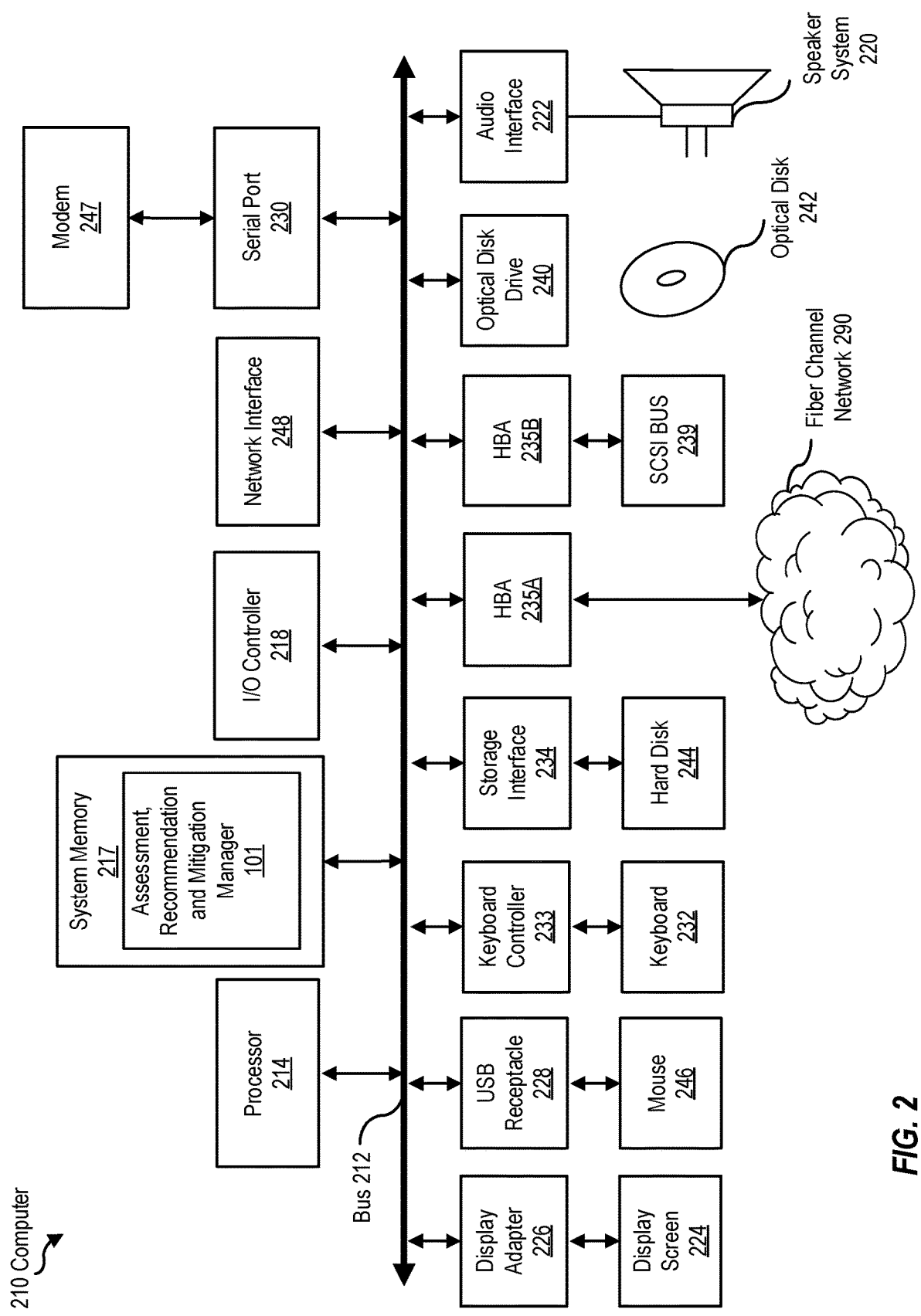
FIG. 2 is a block diagram of a computer system suitable for implementing an assessment, recommendation and mitigation manager, according to some implementations.

FIG. 2 is a block diagram of a computer system 210 suitable for implementing an assessment, recommendation and mitigation manager 101. Both endpoints 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of, e.g., magnetic and/or solid state media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the assessment, recommendation and mitigation manager 101 is s illustrated as residing in system memory 217. The workings of the assessment, recommendation and mitigation manager 101 are explained in greater detail below in conjunction with FIG. 3.

The storage interface 234 is coupled to one or more hard disks 244 (and/or other form of storage media). The storage media may be a part of computer system 210, and/or may be physically separate and accessed through other interface systems.

The network interface 248 and or modem 247 can be directly or indirectly communicatively coupled to a network 107 such as the internet 115. Such coupling can be wired or wireless.

FIG. 3 illustrates the operation of an assessment, recommendation and mitigation manager 101, according to some implementations. As described above, the functionalities of the assessment, recommendation and mitigation manager 101 can reside on a single computer systems 210 (e.g., a server 105), or be distributed between multiple computer systems 210, including within a cloud-based computing environment in which the functionality of the assessment, recommendation and mitigation manager 101 is provided as a service over a network such as the internet 115. It is to be understood that although the assessment, recommendation and mitigation manager 101 is illustrated in FIG. 3 as a single entity, the illustrated assessment, recommendation and mitigation manager 101 represents a collection of functionalities, which can be instantiated as a single or multiple modules as desired (an instantiation of specific, multiple modules of the assessment, recommendation and mitigation manager 101 is illustrated in FIG. 3). It is to be understood that the modules of the assessment, recommendation and mitigation manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "server," "server computer," "endpoint," "endpoint computer," "client," "client computer," and "computing device" mean one or more physical or virtual computers configured and/or programmed to execute the described functionality. Additionally, program code to implement the functionalities of the assessment, recommendation and mitigation manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

Returning to FIG. 3, the operations of the assessment, recommendation and mitigation manager 101 are now described in more detail. The assessment, recommendation and mitigation manager 101 can automatically track the dynamic threat landscape to which computer resources of the enterprise 109 (e.g., the enterprise level computer network 107 which includes multiple computing devices 102 and software platforms 117) are particularly vulnerable. To do so, the assessment, recommendation and mitigation manager 101 can identify the type of enterprise at any level of granularity (e.g., financial services organization, medical services provider, university, media publisher, government department, large chain retailer, etc.), as well as the physical location(s) of enterprise 109 (e.g., country, state/province, city, continent), the markets in which it operates and/or the types of customers/users with which it interfaces. Also identified are the specific ones and types of computing devices 102 and software platforms 117 deployed in the enterprise level computer network 107 (e.g., operating systems, firewalls, networking devices, email server, web service platforms, databases, etc.). The assessment, recommendation and mitigation manager 101 may also receive detections, alerts and associated metadata 315 concerning suspicious and/or malicious events from the enterprise level security system 303. As described in more detail below, based on this information the assessment, recommendation and mitigation manager 101 can automatically identify specific threats, types of threats, and/or threat groups to which the enterprise type and the specific hardware and software deployed in the enterprise level network 107 are especially vulnerable, as well as specific tactics, techniques, and/or procedures used by the identified threats, types of threats, and/or threat groups. In making such assessments, the assessment, recommendation and mitigation manager 101 may automatically use existing detections of suspicious and/or malicious events within the enterprise level security system 303. The assessment, recommendation and mitigation manager 101 can thus prioritize specific threats, tactics, techniques, and/or procedures against which the enterprise 109 should be particularly defended (i.e., those to which the enterprise 109 is especially vulnerable). It is to be understood that this analysis may be repeated/updated at regular or specific intervals as desired, to maintain a current threat prioritization against the dynamic threat landscape, as well as to account for any changes made at an enterprise level.

In some implementations, identifying prioritized threats can take the form of analyzing MITRE ATT&CK data sources (e.g., ATT&CK for Enterprise). MITRE ATT&CK® is a knowledge base of cyber adversary behavior and taxonomy, including specific tactics, techniques and procedures used for cyberattacks. ATT&CK for Enterprise specifically covers behaviors used against enterprise level networks and cloud based platforms. By analyzing these data sources in light of the gleaned information concerning the type, location, and technological configuration of the specific enterprise 109 being defended, the assessment, recommendation and mitigation manager 101 can determine the prioritized threats, tactics, techniques and procedures to which the enterprise is particularly vulnerable. For example, data feeds can be analyzed using MITRE ATT&CK data sources, and recommendations can be made concerning new data feeds and enhancements to existing data feeds in light of gleaned information concerning type, location, and/or technological configuration of the specific enterprise. In addition or instead, other data collections/databases (proprietary and/or publicly accessible) containing information at any level of granularity concerning cyberthreats can be analyzed in this context.

Thus, the assessment, recommendation and mitigation manager 101 may create a prioritized threat list 313. It is to be understood that the granularity of the list 313 can vary between implementations as desired (i.e., the threat list 313 may contain threats, threat types, threat groups, tactics, techniques, procedures, etc., as desired). The exact format and content of the threat list 313 may vary between implementations as desired. The threats identified in the prioritized threat list 313 are those that are applicable to the specific enterprise 109 at any desired level of granularity (e.g., threat techniques known to target the organization's technological environment, business processes, customer demographic, industry, location, data, and/or any combination of these and other factors). This prioritized threat list 313 can subsequently be used for analysis of the effectiveness of threat detection, triage, response and mitigation as described in more detail below.

The specific threat intelligence information that is obtained and analyzed to create the prioritized threat list 313 can vary between implementations. Table 1 below outlines examples of specific analysis factors that can be utilized in this process. It is to be understood that this is just an example of possible factors, and in different embodiments, fewer, more and/or different factors can be utilized. Different weights can be assigned to different factors in different implementations as desired.

TABLE 1

| Name | Example Scale | Description |
| --- | --- | --- |
| Identify Associated Threat Groups | Low, Medium, High | Create list of threat groups that align to the type of enterprise |
| Threat Group Likelihood | 1-5 | Determine likelihood of threat group targeting the enterprise |
| Threat Group Sophistication | 1-5 | Determine how sophisticated threat group is |
| Threat Group Trend | 1-5 | Determine current threat landscape trends based on recently obtained intelligence |
| List of Threat Groups by Priority | Low, Medium, High | Create a list of threat groups that are applicable to the enterprise and denote what the priority is of each. Priority is used to determine which threat groups are most important to protect enterprise against. |
| Identify Priority Platforms | Low, Medium, High | List of example platforms may be displayed to enterprise security analysist, who can indicate level of importance of each based on enterprise environment (e.g.,. AWS, Linux, Windows, etc.) |
| List of Enterprise Platforms by Priority | Low, Medium, High | Create a list of platforms deployed in enterprise, and denote which ones are most important to defend |
| Collect Enterprise Platform Priorities | Low, Medium, High | Input from enterprise on cloud platforms to prioritize (e.g., Widows, Linux, Cloud) |
| Collect Enterprise Threat Group Priorities | Low, Medium, High | Input from enterprise on threat groups to prioritize |
| Identify Threat Technique Likelihood | 1-5 | Identify likelihood of threat technique being used by a threat group against enterprise |
| Identify Threat Technique Impact | 1-5 | Identify how impactful a threat technique would be on the enterprise if used successfully by a threat group |
| Associated Threat Sub-Techniques | N/A | List of MITRE sub techniques that are associated with the threat groups identified above |
| Threat Sub-Technique Likelihood | 1-5 | Determine likelihood of sub technique to be used during an attack |
| Threat Sub-Technique Impact | 1-5 | Determine how critical is the sub technique for the attacker to meet its objectives. Determine how realistic is it for this technique to be detected in a SOC with a fairly accurate efficacy rating. |
| High Priority Sub-Techniques | 1-5 | Prioritizes which techniques out of those identified are most important |
| Associated Threat Tools | N/A | List of MITRE tools that are associated with prioritized threat groups and/or techniques. Tools are commercial, open-source, built-in, or publicly available software that could be used by a defender, pen tester, red teamer, or an adversary. This category includes both software that generally is not found on an enterprise system as well as software generally available as part of an operating system that is already present in an environment. Examples include PsExec, Metasploit, Mimikatz, as well as Windows utilities such as Net, netstat, Tasklist, etc. |
| Threat Tools Likelihood | 1-5 | Determine likelihood of tools to be used during an attack on enterprise |
| Threat Tools Impact | 1-5 | Determine how critical tool is for the attacker to perform its objectives. Determine how realistic is it for this tool to be detected in a SOC with a fairly accurate efficacy rating. Determine whether tool damages anything. |
| High Priority Tools | 1-5 | Prioritizes which tools are most important |
| Associated Threat Malware | N/A | Identify malware that is associated with prioritized threat groups and/or the techniques. Malware is commercial, custom closed source, or open source software intended to be used for malicious purposes by adversaries. Examples include PlugX, CHOPSTICK, etc. |
| Threat Malware Likelihood | 1-5 | Determine likelihood of malware being used an attack on enterprise |
| Threat Malware Impact | 1-5 | Determine criticality of the malware for the attacker to perform its objectives. Determine how realistic is it for this malware to be detected in a SOC with a fairly accurate efficacy rating. Determine whether the malware damages anything. |
| High Priority Malware | 1-5 | Prioritize which malware is most important to protect against |
| Associated Threat Vulnerability | N/A | Create list of Common Vulnerabilities and Exposures (CVEs) that are applicable to the enterprise. Based on a list software, applications, products, operating systems, etc., deployed by enterprise. |
| Threat Vulnerability Likelihood | 1-5 | Determine likelihood of CVE being used during an attack on enterprise |
| Threat Vulnerability Impact | 1-5 | Determine criticality of the CVE for the attacker to perform its objectives. Determine how realistic is it for given CVE to be detected in a SOC with a fairly accurate efficacy rating. Determine whether the CVE damages anything. |
| High Priority Vulnerabilities | 1-5 | Prioritizes which CVEs out of those identified are most important |
| New Trending Threats | N/A | Monitor evolving threats based on current usage |
| High Priority New Threats | 1-5 | Prioritize which new threats of the ones identified are most important |
| Identify High Priority Platforms | 1-5 | List of MITRE platforms is displayed and the enterprise indicates which platforms are most important to it based on its environment (e.g., AWS, Linux, Windows, etc.) |
| High Priority Platforms | 1-5 | Prioritizes MITRE techniques based on existing platforms/infrastructure that the enterprise has. For example, if the enterprise is a windows only environment, all Linux platform techniques should not apply). |
| High Priority Business/Services | 1-5 | Prioritizes MITRE techniques based on business services the company offers. For example, if enterprise does not have externally facing web |

TABLE 1-continued

| Name | Example Scale | Description |
| --- | --- | --- |
| | | services, those techniques should not be prioritized. |
| Generate Prioritized Threat List | Low, Medium, High | Generate a list of threat components (e.g., techniques) to be prioritized for enterprise, optionally with a specific priority assigned to each |

Turning now to the analysis of data feeds 305, the assessment, recommendation and mitigation manager 101 can automatically inventory and assess the data feeds 305 maintained by the enterprise level security system 303 of the specific enterprise 109. These data feeds 305 may include alerts and logs generated by components of the enterprise level security system 303, such as product alerts generated by specific cybersecurity products (e.g., an antimalware system) and logs maintained by various components (e.g., firewalls, intrusion protection systems, access management systems, etc.). In this context, the assessment, recommendation and mitigation manager 101 can identify specific alerts and specific log entries generated by various components in the enterprise level security system 303, and map them to specific threat components in the tracked dynamic threat landscape (e.g., specific entries in the prioritized threat list 313). Note that as the term is used herein, a "threat component" can be in the form of a tactic, technique, and/or procedure (TTP) used by a malicious party in an attack or other malicious activity, but can also be in the form of other instantiations of cybersecurity threat activity outside of the TTP framework.

This assessment may include identifying the log entries and generated alerts, and their associated sources (e.g., specific platforms and security products) where applicable. These identified data feeds 305 can be mapped them to specific threat components in the tracked dynamic threat landscape, for example by analyzing threat intelligence and research 311, such as, e.g., MITRE ATT&CK data sources. This enables the assessment, recommendation and mitigation manager 101 to identify feed data appropriate for detecting, analyzing, responding to and/or mitigating specific threat components in the tracked dynamic threat landscape, and thus in turn to identify relevant feed data that both is and is not absent from what is currently maintained by the enterprise level security system 303. Additional assessment attributes can include, for example, the depth of the logs collected by the enterprise level security system 303 (e.g. how many different event types from a given source are logged?) and the scope of the collection (e.g., for how many assets and users is a given log being collected?).

The enterprise level security system 303 can automatically quantify the effectiveness of the data feed utilization by the enterprise level security system 303, relative to the tracked dynamic threat landscape to which the computer resources of the specific enterprise are subject. This can include, for example, identifying multiple categories concerning feed data, such as feed data mapped to specific threat components in the tracked dynamic threat landscape, feed data tracked by the enterprise level security system 303, feed data relevant to detecting and/or mitigating specific threat components in the tracked dynamic threat landscape, and the processing of feed data by the enterprise level security system 303. It is to be understood that these are just examples of possible categories. In any case, each one of the identified categories concerning feed data is analyzed, and a specific quantification score is calculated denoting effectiveness of data feed utilization by the enterprise level security system 303, as described in more detail below.

More specifically, the assessment, recommendation and mitigation manager 101 can create a list of data categories that are most effective for detecting threats on the prioritized threat list 313. The assessment, recommendation and mitigation manager 101 can automatically map all data feeds 305 maintained by the enterprise security system 303 to these data categories, and provide a detailed breakdown of the data feed quality per category. The assessment, recommendation and mitigation manager 101 can then use this information to determine and quantify the effectiveness of data feed utilization by the enterprise, represented by, e.g., a numerical score, for example from 1-100.

This process builds on the generation of the prioritized threat list 313 as described above. The assessment of the data feeds 305 enables an articulation of which types of data sources should be monitored to best detect the items on the prioritized threat list 313. In addition, the details of the relevant data feeds may be analyzed for a better understanding of the quality thereof. Quality of feed data is an important component for threat detection. If the monitored feeds are not providing the most relevant information in a timely manner, the effectiveness of the threat detection will be negatively impacted.

Table 2 details examples factors (weighted or otherwise) that the assessment, recommendation and mitigation manager 101 may use in the assessment and quantification of the effectiveness of data feed utilization by the enterprise. Table 2 describes these factors, and what information is collected and automatically processed from the enterprise's logging environment for each. The factors illustrated in Table 2 are just examples of possible factors, and in different implementations, fewer, more and/or different factors can be utilized, and different weights can be assigned to different factors as desired.

TABLE 2

| ID | Name | Example Scale | Description |
| --- | --- | --- | --- |
| F1 | Important Data Feeds | N/A | Important data feeds may be determined by analysis of data sources that are crucial to detect items from prioritized threat list |
| F2 | Data Feeds Availability | Good, Adequate, Poor, Missing | This may be obtained through auto extraction of data feeds from logging environment and in conjunction with enterprise validation. |
| F3 | Data Feed Priority | 1-5 | Priority can be determined by number of components from the prioritized threat list mapped to a specific feed for detection. The feed that aids in detecting the most prioritized threats is the higher priority. |
| F4 | Data Feed Environment/ Scope Coverage | N/A | This determines which systems are logging the feeds mapped to detection of prioritized threats. For example, how many machines or infrastructure components are logging these feeds? Are servers, laptops, critical infrastructure, PROD vs UAT, etc., in the enterprise all generating this data? |
| F5 | Data Feed Timeliness | Near Real Time, 5-30 m, | This determines how long it takes for the feeds identified in F1 to be sent to the SIEM. The longer the |

TABLE 2-continued

| ID | Name | Example Scale | Description |
|---|---|---|---|
| | | 1-6 hrs, 6-12 hrs, 12-24 hrs, 24 + hrs | delay, the more impact (in a negative way) on the SIEM maturity. Feeds should be coming in near real time for the SOC to be effective in detection and response. |
| F6 | Data Field Availability & Parsing | Good, Adequate, Poor, Missing | This determines how well each field identified in F1 is parsed and normalized. Feeds should be extracted and aligned to a data model for the SOC to be effective in building correlation and triage |
| F7 | Data Field Priority | 1-5 | This determines which fields in each data feed are most important to be able to detect the threats identified in the prioritized threat list. Being able to parse and extract the most important fields is very important for an enterprise to detect the associated threats |
| F8 | Data Field Health Monitoring | 1-5 | Automated process that monitors the health of the parsing and normalization for the fields indented in F7 for the feeds identified in F1. If the fields continue to break, that impacts detection. |
| F9 | Data Feed Health Monitoring | Good, Adequate, Poor, Missing | Automated process that monitors the health the feeds identified in F1. If the feeds continue to break, that impacts detection. |
| F10 | Data Feed Score (Per Feed) | Good, Adequate, Poor, Missing | A formula that provides a score (e.g., a RAG score) for the components identified. |
| F11 | Data Feed Reliability Score | 1-5 | Uses the field and parsing scoring to determine how reliable from a data perspective that feed is at being able to detect the threats in the prioritized list |
| F12 | Data Identity and Asset Management | 1-5 | Determines how much asset and identity data is available in the enterprise environment for enrichment, e.g., ability to build relationships between raw events and actual applications and critical infrastructure. A lack of ability to do this should negatively impact the maturity score. |
| F13 | Data Feed Effectiveness Quantification | 1-5 | Measurement of effectiveness of data feed usage by enterprise in light of prioritized threat list |

The assessment, recommendation and mitigation manager 101 can also automatically inventory, assess and quantify the effectiveness of threat detection rules 307 deployed by the enterprise level security system 303. The effectiveness of threat detection rule 307 utilization by the enterprise level security system 303 is quantified, relative to the tracked dynamic threat landscape to which the computer resources of the specific enterprise 109 are subject (e.g., the prioritized threat list 313). More specifically, the assessment, recommendation and mitigation manager 101 can assesses the detection rules 307 deployed at the SIEM (s) 113 for their relevance and effectiveness (e.g., correlation quality, alert volume, alert staleness) for detecting prioritized threats. A corresponding quantification score is generated.

For example, multiple categories concerning threat detection can be identified, such as mapping of threat detection rules to specific threat components in the tracked dynamic threat landscape, relevance of threat detection rules deployed by the enterprise level security system 303 to specific threat components in the tracked dynamic threat landscape, quality of threat detection rules deployed by the enterprise level security system 303, completeness of threat detection rules deployed by the enterprise level security system 303, ability of the enterprise level security system 303 to detect specific types of threat components, and ability of the enterprise level security system 303 to detect new threat components. Each one of the identified categories concerning threat detection can be analyzed, and a specific quantification score denoting the effectiveness of threat detection rule utilization by the enterprise level security system 303 can be calculated, based on analysis of each one of the identified threat detection categories.

Table 3 details examples factors (weighted or otherwise) that the assessment, recommendation and mitigation manager 101 may utilize in the quantification of the effectiveness of threat detection rules 307 utilized by the enterprise level security system 303. Table 3 describes these factors, and what information is collected and automatically processed from the enterprise's detection environment to be able to better understand the ability of the enterprise security system 303 to detect prioritized threats. The factors illustrated in Table 3 are just examples of possible factors, and in different implementations, fewer, more and/or different factors can be utilized, and different weights can be assigned as desired.

TABLE 3

| ID | Name | Description |
|---|---|---|
| D1 | Alert Technique Mapping | Enterprise provides a list of existing alerts (e.g., name, alert description, index and source type). This dataset can then be enriched to identify the mapping to MITRE. |
| D2 | Alert Technique Score | Enterprise's existing list of alerts can be mapped to identified techniques. The list then can be prioritized in terms of high priority techniques. |
| D3 | Alert Sub-Technique Mapping | Enterprise's existing list of alerts can be mapped to identified sub-techniques. |
| D4 | Alert Sub-Technique Score | Enterprise's existing list of alerts can be mapped to identified sub-techniques. The list then can be prioritized in terms of high priority techniques. |
| D5 | Alert Tools Mapping | Enterprise's list of existing alerts can be mapped to identified threat tools. |
| D6 | Alert Tools Score | Enterprise's existing list of alerts can be mapped to identified threat tools.. The list then can be prioritized in terms of high priority tools. |
| D7 | Alert Malware Mapping | Enterprise's list of existing alerts can be mapped to malware categories identified as described above. |
| D8 | Alert Malware Score | Enterprise's existing list of alerts can be mapped to identified malware.. The list then can be prioritized in terms of high priority malware. |
| D9 | Alert New Threats Mapping | Identify new threats that are being used at higher rates by adversaries, and ensure those new threats are prioritized by the enterprise. |
| D10 | Alert New Threats Score | Enterprise's existing list of alerts can be used to identify gaps in the threat landscape based on newly identified threats that are not being taken into detected account. |
| D11 | Alert Vuln Mapping | Enterprise's list of existing alerts can be mapped to applicable vulnerabilities identified above. May have enterprise provide a list of common applications and operating systems used to get this list. |
| D12 | Alert Vulnerability Score | Enterprise's existing list of alerts can be mapped to vulnerabilities identified as described above. The list then can be prioritized in terms of high priority vulnerabilities. |

TABLE 3-continued

| ID | Name | Description |
|---|---|---|
| D13 | Compensating Controls Mapping | If the enterprise has a gap in any of the identified mappings described above, but has compensating controls to reduce risk/limit exposure, this should help to offset some gaps in the maturity score. In some cases, compensating controls in mitigation or block mode preventing techniques or tools is better security posture than just detection. Enterprise should receive high maturity in the cases where it has controls and detection. |
| D14 | Overall Alert Threat Coverage Score | How well the enterprise is able to detect all applicable identified threats. |
| D15 | Alert Detection Environment/ Scope Mapping | Identifies whether the enterprise has any significant gaps in any odf the identified monitoring areas. (e.g., no alerts in Unix, no alerts for critical applications, other users Identifies whether the enterprise has any significant gaps in any of the identified or infrastructure, etc.) |
| D16 | Alert Environment Coverage Score | Gives enterprise a score in how well its detection is for certain environments. Enterprise should have a certain amount of detection coverage for critical business processes to receive higher score (e.g., 20%). |
| D17 | Alert Tested/ Validated (Red Team) | Determines whether rules have been tested/ validated by a security technology (e.g., Verodin) or team (e.g., Red Team) that actually detects the activity it is supposed to detect as expected. Rules that have not been tested or validated should impact overall alert score (negatively). |
| D18 | Alert Staleness | List of alerts that have not been updated within given period of time, e.g., the past year. Stale rules should have a negative impact on score. Every rule should be reviewed at least yearly to ensure good quality. |
| D19 | Custom Threat Intelligence Driven Alerts | List of rules that are driven by enterprise specific intelligence. Mature SIEM should always have at least a specific rule set to protect enterprise. |
| D20 | DR Plan | How many of enterprise's alerts can be easily turned over into a DR environment if its SHC goes down? What is recovery time objective for Ops? The longer the RTO, the more negative impact it should have on score. |
| D21 | Alert Health Monitoring | What percentage of enterprise's alerts run as expected every runtime? If a decent amount of alerts fail to run on a regular basis, that should impact score. |
| D22 | Alert time frame and frequency (cron) | How often are rules running? Rules that run infrequently means the dwell time to respond is greater. |
| D23 | Overall Threat Detection Rule Effectiveness Score | This number is the final detection score that is calculated based on factors described above. |

The assessment, recommendation and mitigation manager 101 may also automatically assess the processing capability of alerts generated by threat detection rules of the enterprise level security system 303, and automatically quantify the effectiveness thereof (e.g., how quickly and effectively the SOC 111 is able to triage alerts that originate from threat detection rules 307). In this capacity the assessment, recommendation and mitigation manager 101 may identify multiple categories concerning processing capability of alerts generated by threat detection rules, such as, for example, alert efficacy, correlation of alerts to actual security events, alert triage time, new alert development time, quantity of security incidents processed per period of time, periods of time utilized to process security incidents, and amounts and/or effectiveness of human analyst time utilized in alert processing. Based on analysis of each of these identified categories, the assessment, recommendation and mitigation manager 101 may calculate a specific quantification score denoting the capability of the enterprise level security system 303 to respond to detection rule generated alerts.

Table 4 details examples factors (weighted or otherwise) that the assessment, recommendation and mitigation manager 101 may utilize in the quantification of the processing capability of alerts generated by threat detection rules of the enterprise level security system 303. The factors illustrated in Table 4 are just examples of possible factors, and in different implementations, fewer, more and/or different factors can be utilized, and different weights can be assigned as desired.

TABLE 4

| Name | Type | Example Scale | Description |
|---|---|---|---|
| Alerts Actioned Ratio | Percentage | N/A | How many alerts fire each day, and what percentage of those get triaged by a human or a SOAR system for further analysis? A mature SOC will triage all alerts that trigger. |
| Alert Efficacy | Automated | N/A | How many alerts that trigger are determined to be false positives after human triage? |
| Alert Correlation Ratio | Automated | N/A | What percentage of triaged alerts have some form of correlation? This means looking for multiple events per search or using multiple data feeds. Mature SOCs will normally use correlation to improve efficacy. |
| Alert Feed Integrity/Ratio | Automated | Good, Adequate, Poor, Missing | What percentage of enterprise's alerts can be properly triaged based on the data feed? How effective are its exposure checks based on the logging and data available? What is its tendency to miss something? |
| Alert Volume Per Alert | Automated | N/A | How many events does each alert trigger to be triaged per day |
| Average Alerts Per Day | Automated | N/A | The average number of events each alert generates per day. |
| Average Alert Triage Time | Number | Range | The estimated amount of time it takes for each alert to be triaged (e.g., 5 minutes on average). |
| Analyst Headcount | Number | Range | How many analysts does enterprise have on staff working at the same time to investigate/triage the alerts |
| Alert to Analyst Ratio | Automated | N/A | Determine the alerts to analyst ratio to determine if enterprise has adequate resources to effectively respond to the volume of alerts. |
| Average Time to Triage per day | Automated | N/A | Determine number of hours spent triaging alerts per day. |
| Alert Time to Develop | Automated | N/A | Determine estimated amount of time it takes to develop an alert |
| Alert Tuning/ Enhancements, Validation | Automated | N/A | How many tuning requests are completed per alert per year and how many alerts go through a QA/testing process that is documented. Rules should get updated at least 2-3 times a year with some sort of testing/validation process. |
| Alert White Listing/Allow Listing | Automated | N/A | Are allow lists used per alert? If so, how often are they updated to reduce noise? |
| Incident/Case Results Per Day & Average | Number | N/A | How many incident tickets or cases does the enterprise process each day based on the alerts received? How long does each case take on average? |

TABLE 4-continued

| Name | Type | Example Scale | Description |
| --- | --- | --- | --- |
| Triage Dwell Time Score | Number | N/A | How much time on average occurs from when an alert triggers an event to when an analyst closes/mitigates the activity. |
| Hunting Score | Percentage | 1-20% 21-30% 31-50% 51-70% 71-100% | How much time is spent by each analyst hunting per day? |
| Overall Alert Processing Capability (Productivity) Score | Automated | 1-100 | This number is the final productivity score that is calculated based on the factors described above. |

Further, the assessment, recommendation and mitigation manager 101 may automatically assess the threat response capability of the enterprise level security system 303, and quantifying the effectiveness thereof (e.g., how capably is the SOC 111 able to respond to threats after they have been detected). Responding to a threat can comprise controlling the threat by taking actions to prevent the threat from being able to penetrate the enterprise and/or compromise its resources, such as changing firewall settings or fixing vulnerabilities that enable the threat to successfully attack the enterprise. Responding to a threat can also comprise mitigating an attack by the threat, for example by terminating active malicious processes, repairing damaged files, restoring system settings changed by the attack, etc. Multiple categories concerning threat be response capability can identified, such as deployed threat mitigation tools, ratio of automatic to manual threat mitigations per period of time, response dwell time, and percentage of threats successfully mitigated per period of time. Each of the identified categories is analyzed, and in response a quantification score is calculated, denoting the capability of the enterprise level security system 303 to mitigate threats.

Table 5 details examples factors (weighted or otherwise) that the assessment, recommendation and mitigation manager 101 may utilize in the quantification of the threat response capability of the enterprise level security system 303. The factors illustrated in Table 5 are just examples of possible factors, and in different implementations, fewer, more and/or different factors can be utilized, and different weights can be assigned as desired.

TABLE 5

| Name | Description |
| --- | --- |
| Mitigation Tool List | List of tools the enterprise has at its disposal to properly respond to a security incident across the different data domains and technology stack. |
| Alert Auto Mitigation List | Which tools perform some level of mitigation automatically (e.g., anti-virus, email signatures, etc.) |
| Alert Auto Mitigation Ratio | On which alerts is mitigation automatically performed? |
| Manual Mitigation Capability List | What capabilities do the analysts have to stop the activity after triage or during analysis? |
| Exposure Check Accuracy Score | How accurate are exposure checks to see what other similar activity occurred? If feed scores are inconsistent, then activity may be missing in checks that is there but cannot be seen |

TABLE 5-continued

| Name | Description |
| --- | --- |
| Response Dwell Time Score | What is dwell time to respond to security incidents? The longer it takes to mitigate, the more malicious activity an attacker can perform |
| Ability to Mitigate Threats Ratio | How many of the alerts an analysts receives are they able to stop if it is a true positive |
| Threat response capability Score | This number is calculated using the factors described above. |

The assessment, recommendation and mitigation manager 101 automatically quantifies an effectiveness of the enterprise level security system 303 as a whole, based on at least the tracked dynamic threat landscape, and the quantifications of the effectiveness of data feed utilization and threat detection rule utilization by the enterprise level security system 303. The quantifications of the processing capability of alerts generated by threat detection rules and/or the threat response capability of the enterprise level security system 303 can be taken into account as well. In other words, as noted above, the overall effectiveness quantification can be calculated as a score 301, rating a combination of determined quantifications of the ability of the enterprise level security system 303 to prioritize, log, detect, triage, respond to, and mitigate security threats. The assessment, recommendation and mitigation manager 101 can apply different weights to different sub-quantifications taken into account when calculating the overall score 301, as well as to different categories used in calculating different sub-quantifications. Which factors to weight and how much to weight different factors are design parameters that can vary between implementations as desired.

Thus, the overall score 301 provide a detailed understanding of an enterprise's security posture, based on the factors described above (e.g., threat landscape, data feeds 305, threat detection rules 307, alert processing capability, and threat response capability). Each factor is informed by multiple categories that can identify vulnerabilities and gaps within the configuration of the enterprise level security system 303. These identified gaps can be used to provide detailed recommendations 309 for improvement, and to execute threat mitigation actions.

Describing this process in more detail, the overall score 301 may be computed using the primary sub-quantifications described above, each of which is in turn calculated based on multiple relevant categories. The calculation of the overall score 301 may take into account a prioritized set of tactics, techniques, and procedures that are commonly used by specific threat groups that target the enterprise, based on its type (e.g., field, industry, size, etc.), location, and deployed technology (e.g., platforms, infrastructure, etc.). Below are some examples of use cases concerning the overall score 301.

The overall score 301 can be, for example, a numerical value from 0-100. The overall score 301 may be denote multiple effectiveness ranges (e.g., beginning, evolving, intermediate, advanced, and innovative). Each range may distinguish different levels of the effectiveness/maturity of the enterprise level security system 303, in order to enable, e.g., security analysts to understand their security posture, for example based on cybersecurity standards or the security postures of their industry peers. As one possible example, a score of, e.g., 0-20 could indicate a beginning effectiveness level, in which the cybersecurity detection and response program is in its initial stages using, e.g., ad-hoc methodologies. At this level, threats would typically not be clearly identified or prioritized, data would be either not logged, parsed correctly or aggregated to be able to detect suspicious activity, no structured or repeatable processes would be defined to create detections, resources and systems would not be deployed to properly respond to alerts, and proper technology controls would not be implemented correctly in order to properly prevent and respond to threats. At this level, security incidents and threat activity have a high probability of going undetected.

A score of, e.g., 21-40 could indicate that the effectiveness of the system is evolving, indicating that a more formal cybersecurity detection and response organization exists (either built internally or outsourced). Efforts are documented and structured. However, no significant intelligence capability has been created to prioritize threats and vulnerabilities, the majority of detections are generated from security technology with limited enterprise input, the volume of alerts is high and alert efficacy is low, requiring significant manual triage. The dwell time to respond is high. Critical cybersecurity incidents and threat activity has a substantive probability of going undetected, or if detected, will not likely be responded to within a reasonable period of time to be effective in disrupting an adversary's actions or objectives.

A score of, e.g., 41-60 could indicate that the effectiveness of the system is intermediate. An intermediate score could indicate, for example, that a formal and effective cybersecurity detection and response organization exists. Key relevant data sources are collected and parsed correctly. A good set of threat detection rules are in place. Complete visibility and detection coverage is still lacking. Due to the limited resources and the increased number of alerts from the both custom built detections and security vendors, the high alert volume is not sustainable. Triage takes longer than is desirable due to minimal correlation and enrichment. Triage and responses are still largely manual, the organization is still primarily reactive, and security controls may exist but are misconfigured and not able to adequately prevent/mitigate threats A score of, e.g., 61-80 could indicate that the effectiveness of the system is advanced. This indicates a mature cybersecurity detection and response organization where processes are managed quantitatively to establish predictable results. Efforts have been documented, structured, and standardized, and processes of detection and response are properly defined and repeatable across lines of business. The enterprise has a proficient understanding of relevant threats and priorities. Alert volume and efficacy is sustainable, and resources or technologies are deployed that are able to handle and remediate the threats within a reasonable period of time. In-depth security defense exists (e.g., layers of controls) to help thwart successful attacks. Automation is in place to handle repetitive tasks. Analysts spend time on hunting and automation along with triaging.

A score of, e.g., 61-80 could indicate that the system is innovative. Extremely sophisticated cybersecurity detection and response organization exists here. Such organizations can not only detect, triage and respond to known threats, but also drive innovation in people, processes and technology for the organization and the industry to manage cyber-risks. Such organizations develop new controls and tools, and form information sharing groups. Real-time and predictive analytics may be tied to automated processes.

It is to be understood that these ranges and the effectiveness levels they denote are examples only.

The assessment, recommendation and mitigation manager 101 can also automatically output recommendations 309 concerning more effective utilization of data feeds 305 and/or threat detection rules 307 to protect the computer resources of the specific enterprise 409 against the tracked dynamic threat landscape. Recommendations 309 can also be automatically made to improve the processing capability of alerts generated by threat detection rules and/or the threat response capability of the enterprise level security system 303.

Such recommendations 309 can take the form of suggesting specific new threat components to prioritize and/or existing threat components to re-prioritize, based on detected changes to the tracked dynamic threat landscape to which the computer resources of the specific enterprise are subject. Another example is recommending new feed data to collect and process, improvements to make monitoring and processing of existing data feeds, changes to existing logging configurations, and/or steps to improve data feed normalization and parsing. Recommendations 309 can indicate which new data feeds 305 to collect and which existing data feeds to upgrade 305 (e.g., collect new event types in an existing log) so that prioritized rules have the data to correctly execute their correlations, making the rule most effective against prioritized threats.

Examples of recommendations 309 concerning detection rules include new and/or updated detection rules to deploy in order to fill threat detection gaps, recommendations 309 concerning automation regression testing of detection rule generated alerts, and/or recommendations 309 to automatically tune and/or update detection rules. Recommendations 309 can also indicate specific detection rules to deploy to have greater impact against prioritized threats. Such detection rules may be sourced from, e.g., a repository of rules available to the enterprise. This repository may contain, for example, rules provided by the assessment, recommendation and mitigation manager 101, rules developed by the enterprise, and rules that may be shared by other trusted enterprises.

Concerning improvement of processing capability of alerts generated by threat detection rules, possible recommendations 309 may include suggestions for correlating alerts to actual security events, improving alert efficacy, improving alert triage time, improving new alert development time, lowering alert volume, and/or lowering amounts of human analyst time used. Recommendations 309 can also suggest specific productivity changes that if made would enable better correlation to reduce alert volume and improve efficacy of detection to aid in improving response.

On the response capability side, recommendation possibilities include actions to take to improve correlation of detection rule generated alerts to actual security events, to improve alert triage time, to improve new alert development time, to lower alert volume, and/or to lower amounts of human analyst time used in alert processing. Such recommendations 309 can also indicate response changes to more effectively mitigate detected threats, either manually or through automatic means.

The assessment, recommendation and mitigation manager 101 can also automatically take one or more actions to mitigate at least specific threats, for example by automatically implementing a provided recommendation 309.

In some implementations, the assessment, recommendation and mitigation manager 101 also uses the functionality described above to automatically calculate an impact of a proposed change (e.g., proposed by a human SOC analysist operating an interface) to the enterprise level security system 303 on the quantification of the effectiveness thereof. In other words, in response to a proposed change, the assessment, recommendation and mitigation manager 101 can predict the impact the change would have on the overall score 301, and output this information, e.g., through the interface.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting, of the scope of the subject matter set forth in the following claims.

What is claimed is:

1. A computer implemented method in an SOC (Security Operations Center) device on an enterprise network for recommending mitigation of security threats to an enterprise level security system, the method comprising:
   prioritizing, by a processor of the SOC device, threats of a dynamic threat landscape to which computer resources of the enterprise network are subject using existing detections of suspicious and/or malicious events of the enterprise level security system in view of gleaned information concerning type, location and configuration of the enterprise network;
   automatically assessing, by the processor of the SOC device, data feeds received by SIEM (Security Information and Event Management) devices of the enterprise level security system by mapping to the threat priorities, the data feeds comprising at least alerts and logs generated by SIEM devices of the enterprise level security system;
   automatically quantifying an effectiveness of data feed utilization by the enterprise level security system, relative to a tracked dynamic threat landscape to which the computer resources of the enterprise network are subject;
   automatically assessing threat detection rules deployed by the enterprise level security system by mapping to the threat priorities and determining a correlation between deployed threat rules and threat priorities;
   automatically quantifying an effectiveness of threat detection rule utilization by the enterprise level security system, relative to the tracked dynamic threat landscape to which the computer resources of the enterprise network are subject, wherein automatically quantifying an effectiveness of data feed utilization by the enterprise level security system, relative to the tracked dynamic threat landscape to which the computer resources of the specific enterprise are subject further comprises:
      identifying a plurality of categories concerning feed data, the categories comprising at least feed data mapped to specific threat components in the tracked dynamic threat landscape, feed data tracked by the enterprise level security system, feed data relevant to detecting and/or mitigating specific threat components in the tracked dynamic threat landscape that are and are not tracked by the enterprise level security system, and processing of feed data by the enterprise level security system;
      analyzing each one of the identified plurality of categories concerning feed data; and
      calculating a specific quantification score denoting effectiveness of data feed utilization by the enterprise level security system, based on analysis of each one of the identified plurality of categories concerning feed data;
   automatically quantifying an effectiveness of the enterprise level security system as a whole, based on at least the tracked dynamic threat landscape, the specific quantification score denoting effectiveness of data feed utilization by the enterprise level security system, and quantification of the effectiveness of threat detection rule utilization by the enterprise level security system, wherein automatically quantifying an effectiveness of the enterprise level security system as a whole further comprises determining a correlation between detection rule generated events and actual security events;

automatically predicting an impact of at least one recommendation of threat detection rules to the enterprise level security system on the quantification of the effectiveness of the enterprise level security system as a whole, the at least one recommendation of threat detection rules to the enterprise level security system being configured to improve the operation of the enterprise level security system and to decrease its risk of vulnerability to cybersecurity threats; and automatically taking at least one action on the enterprise level security system concerning the at least one recommendation to mitigate at least one specific threat to which the computer resources of the enterprise network are subject, the at least one action thereby improving the operation of the enterprise level security system and decreasing its risk of vulnerability to cybersecurity threats.

2. The computer implemented method of claim 1 further comprising:

automatically assessing processing capability of alerts generated by threat detection rules of the enterprise level security system; and automatically quantifying the processing capability of alerts generated by threat detection rules of the enterprise level security system.

3. The computer implemented method of claim 2 wherein automatically quantifying an effectiveness of the enterprise level security system as a whole further comprises:

automatically quantifying an effectiveness of the enterprise level security system as a whole, based on at least the tracked dynamic threat landscape, the specific quantification score denoting effectiveness of data feed utilization by the enterprise level security system, and quantification of the processing capability of alerts generated by threat detection rules of the enterprise level security system.

4. The computer implemented method of claim 2 further comprising:

automatically outputting at least one recommendation to improve the processing capability of alerts generated by threat detection rules of the enterprise level security system.

5. The computer implemented method of claim 2 wherein automatically quantifying the processing capability of alerts generated by threat detection rules of the enterprise level security system further comprises:

identifying a plurality of categories concerning processing capability of alerts generated by threat detection rules, the categories comprising at least alert efficacy, correlation of alerts to actual security events, alert triage time, new alert development time, quantity of security incidents processed per period of time, periods of time utilized to process security incidents, and amounts of human analyst time utilized in alert processing;

analyzing each one of the identified plurality of categories concerning processing capability of alerts generated by threat detection rules; and calculating a specific quantification score denoting the capability of the enterprise level security system to respond to detection rule generated alerts, based on analysis of each one of the identified plurality of categories concerning processing capability of alerts generated by threat detection rules.

6. The computer implemented method of claim 1 further comprising:

automatically assessing threat response capability of the enterprise level security system; and automatically quantifying an effectiveness of the threat response capability of the enterprise level security system.

7. The computer implemented method of claim 6 wherein automatically quantifying an effectiveness of the enterprise level security system as a whole further comprises:

automatically quantifying an effectiveness of the enterprise level security system as a whole, based on at least the tracked dynamic threat landscape, the specific quantification score denoting effectiveness of data feed utilization by the enterprise level security system, and quantification of the effectiveness of the threat response capability of the enterprise level security system.

8. The computer implemented method of claim 6 further comprising:

automatically outputting at least one recommendation to improve the threat response capability of the enterprise level security system.

9. The computer implemented method of claim 6 wherein automatically quantifying an effectiveness of threat response capability of the enterprise level security system further comprises:

identifying a plurality of categories concerning threat response capability, the categories comprising at least deployed threat mitigation tools, ratio of automatic to manual threat mitigations per period of time, response dwell time, and percentage of threats successfully mitigated per period of time;

analyzing each one of the identified plurality of categories concerning threat response capability; and calculating a specific quantification score denoting the capability of the enterprise level security system to mitigate threats, based on analysis of each one of the identified plurality of categories concerning threat response capability.

10. The computer implemented method of claim 1 wherein automatically quantifying an effectiveness of the enterprise level security system as a whole further comprises:

automatically quantifying an effectiveness of the enterprise level security system as a whole, based on at least the tracked dynamic threat landscape, the specific quantification score denoting effectiveness of data feed utilization by the enterprise level security system, quantification of effectiveness of processing capability of alerts generated by threat detection rules of the enterprise level security system, and quantification of effectiveness of threat response capability of the enterprise level security system.

11. The computer implemented method of claim 1 wherein automatically tracking a dynamic threat landscape to which computer resources of a specific enterprise are subject further comprises:

automatically identifying an enterprise type to which the specific enterprise belongs;

automatically identifying specific hardware and software platforms utilized in the enterprise level computer network;

automatically identifying threats, types of threats, and/or threat groups to which the enterprise type and the specific hardware and software platforms utilized in the enterprise level computer network are vulnerable;

automatically identifying specific tactics, techniques, and/or procedures used by the identified threats, types of threats, and/or threat groups; and
automatically using existing detections of suspicious and/or malicious events within the enterprise level security system.

12. The computer implemented method of claim 1 wherein automatically assessing data feeds maintained by an enterprise level security system of the specific enterprise further comprises:
identifying specific alerts generated by specific components in the enterprise level security system;
identifying specific log entries generated by specific components in the enterprise level security system;
mapping identified specific identified alerts and specific identified log entries to specific threat components in the tracked dynamic threat landscape;
identifying feed data appropriate for detecting, analyzing, responding to and/or mitigating specific threat components in the tracked dynamic threat landscape; and
identifying feed data relevant to responding to specific threat components in the tracked dynamic threat landscape that are absent from the specific alerts and log entries.

13. The computer implemented method of claim 1 wherein automatically quantifying an effectiveness of threat detection rule utilization by the enterprise level security system, relative to the tracked dynamic threat landscape to which the computer resources of the specific enterprise are subject further comprises:
identifying a plurality of categories concerning threat detection, the categories comprising at least mapping of threat detection rules to specific threat components in the tracked dynamic threat landscape, relevance of threat detection rules deployed by the enterprise level security system to specific threat components in the tracked dynamic threat landscape, quality of threat detection rules deployed by the enterprise level security system, completeness of threat detection rules deployed by the enterprise level security system, ability of the enterprise level security system to detect specific types of threat components, and ability of the enterprise level security system to detect new threat components;
analyzing each one of the identified plurality of categories concerning threat detection; and
calculating a specific quantification score denoting effectiveness of threat detection rule utilization by the enterprise level security system, based on analysis of each one of the identified plurality of categories concerning threat detection.

14. The computer implemented method of claim 1 wherein automatically quantifying an effectiveness of the enterprise level security system as a whole further comprises:
applying different weightings to different factors utilized to calculate the quantification of the effectiveness of the enterprise level security system as a whole.

15. The computer implemented method of claim 1 wherein automatically outputting at least one recommendation further comprises:
automatically recommending new threat components to prioritize and/or existing threat components to re-prioritize, based on detected changes to the tracked dynamic threat landscape to which the computer resources of the specific enterprise are subject.

16. The computer implemented method of claim 1 wherein automatically outputting at least one recommendation further comprises:
automatically recommending new feed data to collect and process, improvements to monitoring and processing of existing data feeds, changes to existing logging configurations, and/or steps to improve data feed normalization and parsing.

17. The computer implemented method of claim 1 wherein automatically outputting at least one recommendation further comprises:
automatically recommending to deploy new and/or updated detection rules to fill threat detection gaps, to automate regression testing of detection rule generated alerts, and/or to automatically tune and/or update detection rules.

18. The computer implemented method of claim 1 wherein automatically outputting at least one recommendation further comprises:
automatically recommending actions to take to improve correlation of alerts to actual security events, to improve alert efficacy, to improve alert triage time, to improve new alert development time, to lower alert volume, and/or to improve effectiveness of human analyst time used.

19. The computer implemented method of claim 1 wherein automatically outputting at least one recommendation further comprises:
automatically recommending actions to take to improve correlation of detection rule generated alerts to actual security events, to improve alert triage time, to improve new alert development time, to lower alert volume, and/or to improve amounts of human analyst time used in alert processing.

20. The computer implemented method of claim 1 wherein automatically taking at least one action to mitigate at least one specific threat to which the computer resources of the specific enterprise are subject further comprises:
automatically implementing at least one provided recommendation.

21. At least one non-transitory computer-readable storage medium in an SOC (Security Operations Center) device, the at least one non-transitory computer-readable storage medium storing computer executable instructions that, when loaded into computer memory and executed by at least one processor, cause the computing device to perform a method for recommending mitigation of security threats to an enterprise level security system, the method the following steps:
prioritizing, by a processor of the SOC device, threats of a dynamic threat landscape to which computer resources of the enterprise network are subject using existing detections of suspicious and/or malicious events of the enterprise level security system in view of gleaned information concerning type, location and configuration of the enterprise network;
automatically assessing, by the processor of the SOC device, data feeds received by SIEM (Security Information and Event Management) devices of the enterprise level security system by mapping to the threat priorities, the data feeds comprising at least alerts and logs generated by SIEM devices of the enterprise level security system;
automatically quantifying an effectiveness of data feed utilization by the enterprise level security system, relative to a tracked dynamic threat landscape to which the computer resources of the enterprise network are subject;

automatically assessing threat detection rules deployed by the enterprise level security system by mapping to the threat priorities and determining a correlation between deployed threat rules and threat priorities;

automatically quantifying an effectiveness of threat detection rule utilization by the enterprise level security system, relative to the tracked dynamic threat landscape to which the computer resources of the enterprise network are subject, wherein automatically quantifying an effectiveness of data feed utilization by the enterprise level security system, relative to the tracked dynamic threat landscape to which the computer resources of the specific enterprise are subject further comprises:
- identifying a plurality of categories concerning feed data, the categories comprising at least feed data mapped to specific threat components in the tracked dynamic threat landscape, feed data tracked by the enterprise level security system, feed data relevant to detecting and/or mitigating specific threat components in the tracked dynamic threat landscape that are and are not tracked by the enterprise level security system, and processing of feed data by the enterprise level security system;
- analyzing each one of the identified plurality of categories concerning feed data; and
- calculating a specific quantification score denoting effectiveness of data feed utilization by the enterprise level security system, based on analysis of each one of the identified plurality of categories concerning feed data;

automatically quantifying an effectiveness of the enterprise level security system as a whole, based on at least the tracked dynamic threat landscape, the specific quantification score denoting effectiveness of data feed utilization by the enterprise level security system, and quantification of the effectiveness of threat detection rule utilization by the enterprise level security system, wherein automatically quantifying an effectiveness of the enterprise level security system as a whole further comprises determining a correlation between detection rule generated events and actual security events;

automatically predicting an impact of at least one recommendation of threat detection rules to the enterprise level security system on the quantification of the effectiveness of the enterprise level security system as a whole, the at least one recommendation of threat detection rules to the enterprise level security system being configured to improve the operation of the enterprise level security system and to decrease its risk of vulnerability to cybersecurity threats; and automatically taking at least one action on the enterprise level security system concerning the at least one recommendation to mitigate at least one specific threat to which the computer resources of the enterprise network are subject, the at least one action thereby improving the operation of the enterprise level security system and decreasing its risk of vulnerability to cybersecurity threats.

22. The at least one non-transitory computer-readable storage medium of claim 21 further comprising storing computer executable instructions that, when loaded into computer memory and executed by at least one processor of a computing device, cause the computing device to perform the following steps:

automatically assessing processing capability of alerts generated by threat detection rules of the enterprise level security system; and automatically quantifying the processing capability of alerts generated by threat detection rules of the enterprise level security system.

23. An SOC (Security Operations Center) device on an enterprise network for recommending mitigation of security threats to an enterprise level security system, comprising:

at least one processor configured to execute program code;

computer memory;

computer code for prioritizing, by a processor of the SOC device, threats of a dynamic threat landscape to which computer resources of the enterprise network are subject using existing detections of suspicious and/or malicious events of the enterprise level security system in view of gleaned information concerning type, location and configuration of the enterprise network;

computer code for automatically assessing, by the processor of the SOC device, data feeds received by SIEM (Security Information and Event Management) devices of the enterprise level security system by mapping to the threat priorities, the data feeds comprising at least alerts and logs generated by SIEM devices of the enterprise level security system;

computer code for automatically quantifying an effectiveness of data feed utilization by the enterprise level security system, relative to a tracked dynamic threat landscape to which the computer resources of the enterprise network are subject, wherein automatically quantifying an effectiveness of data feed utilization by the enterprise level security system, relative to the tracked dynamic threat landscape to which the computer resources of the specific enterprise are subject further comprises:
- identifying a plurality of categories concerning feed data, the categories comprising at least feed data mapped to specific threat components in the tracked dynamic threat landscape, feed data tracked by the enterprise level security system, feed data relevant to detecting and/or mitigating specific threat components in the tracked dynamic threat landscape that are and are not tracked by the enterprise level security system, and processing of feed data by the enterprise level security system;
- analyzing each one of the identified plurality of categories concerning feed data; and
- calculating a specific quantification score denoting effectiveness of data feed utilization by the enterprise level security system, based on analysis of each one of the identified plurality of categories concerning feed data;

computer code for automatically assessing threat detection rules deployed by the enterprise level security system by mapping to the threat priorities and determining a correlation between deployed threat rules and threat priorities;

computer code for automatically quantifying an effectiveness of threat detection rule utilization by the enterprise level security system, relative to the tracked dynamic threat landscape to which the computer resources of the enterprise network are subject;

computer code for automatically quantifying an effectiveness of the enterprise level security system as a whole, based on at least the tracked dynamic threat landscape, the specific quantification score denoting effectiveness of data feed utilization by the enterprise level security system, and quantification of the effectiveness of threat detection rule utilization by the enterprise level security system, wherein automatically quantifying an effectiveness of the enterprise level security system as a whole further comprises determining a correlation between detection rule generated events and actual security events;

computer code for automatically predicting an impact of at least one recommendation of threat detection rules to the enterprise level security system on the quantification of the effectiveness of the enterprise level security system as a whole, the at least one recommendation of threat detection rules to the enterprise level security system being configured to improve the operation of the enterprise level security system and to decrease its risk of vulnerability to cybersecurity threats; and computer code for automatically taking at least one action on the enterprise level security system concerning the at least one recommendation to mitigate at least one specific threat to which the computer resources of the enterprise network are subject, the at least one action thereby improving the operation of the enterprise level security system and decreasing its risk of vulnerability to cybersecurity threats.

* * * * *